United States Patent [19]

Melzer et al.

[11] Patent Number: 4,555,904
[45] Date of Patent: Dec. 3, 1985

[54] ARRANGEMENT OF AN EXHAUST-GAS RETURN SYSTEM FOR AN INTERNAL-COMBUSTION ENGINE HAVING AN EXHAUST-GAS TURBOSUPERCHARGER

[75] Inventors: Hans-Harald Melzer, Neufahrn; Wolf-Dieter Spindeböck, Pfaffenhofen, both of Fed. Rep. of Germany

[73] Assignee: Bayerische Motoren Werke AG, Fed. Rep. of Germany

[21] Appl. No.: 491,425
[22] PCT Filed: Jul. 10, 1982
[86] PCT No.: PCT/EP82/00149
  § 371 Date: Mar. 14, 1983
  § 102(e) Date: Mar. 14, 1983

[30] Foreign Application Priority Data

Jul. 16, 1981 [DE] Fed. Rep. of Germany ....... 3128040

[51] Int. Cl.[4] .................. F02B 37/00; F02M 25/06
[52] U.S. Cl. .................................. 60/605; 60/278
[58] Field of Search .............................. 60/278, 605

[56] References Cited

U.S. PATENT DOCUMENTS 4,250,711  2/1981  Zehnder ................. 60/278
4,355,505 10/1982  Grohn .................... 60/605

FOREIGN PATENT DOCUMENTS 12041  1/1979  Japan ..................... 60/605

Primary Examiner—Douglas Hart
Attorney, Agent, or Firm—Craig and Burns

[57] ABSTRACT

In order to obtain an arrangement of an exhaust-gas system, that is constructively simpler and lighter in weight, for an internal-combustion engine having an exhaust-gas turbosupercharger comprising a compressor casing flanged to the turbine casing, the exhaust-gas return system is disposed at the exhaust-gas turbosupercharger between the hot-gas inlet of the turbine casing and the air-charge outlet of the compressor casing. The exhaust-gas return system is preferably on the one side connected with a damming chamber formed in the hot-gas inlet duct of the turbine casing, and on the other side, with an annular chamber disposed in the compressor outlet duct. By means of a section of the connecting pipe of the exhaust-gas return system disposed at a connecting piece of the compressor casing tangentially to the annular chamber and in outflow direction of the compressed air charge, the returned exhaust gas, in a helicoidal flow direction, is led to the air-charge current for intensive mixing.

2 Claims, 2 Drawing Figures ically to an annular chamber and
ARRANGEMENT OF AN EXHAUST-GAS RETURN SYSTEM FOR AN INTERNAL-COMBUSTION ENGINE HAVING AN EXHAUST-GAS TURBOSUPERCHARGER The invention refers to an arrangement according to the type indicated in the introductory part of the main claim.

It is known, in the case of internal-combustion engines, to connect the exhaust-gas turbosupercharger in the center of the flow at the exhaust-gas collector. This results in exhaust-gas currents in the exhaust-gas collector that go in opposite directions which, in order to avoid a disadvantageous mutual influencing in the exhaust-gas collector, are, in each case, led separately to the hot-gas inlet of the turbine of the exhaust-gas turbosupercharger.

It is also known, in the case of an exhaust-gas super-turbocharged internal-combustion engine having an exhaust-gas return system, to connect an exhaust-gas return system at the exhaust-gas collector. In order to achieve a perfect exhaust-gas return, this system must be connected with each individual gas-distribution duct of the exhaust-gas collector. This requires the development of additional connecting ducts in the exhaust-gas collector that are separate from one another, which makes the exhaust-gas collector costly to manufacture.

In addition, in the case of the known exhaust-gas return systems, a relatively long connecting pipe is used, which is heavy because of additional mounting support, and which is frequently led over the cover of the control-shaft space or of the cylinder head of the internal-combustion engine to the air collector. In addition to the increased mounting costs for the connecting pipe, there is also the disadvantage that the abovementioned parts of the internal-combustion engine during maintenance are not accessible without a dismounting of the exhaust-gas return system or the connecting pipe.

The invention therefore has an objective of creating an arrangement of an exhaust-gas return system for an internal-combustion engine having an exhaust-gas turbosupercharger, that is lighter and simpler in construction.

This objective is achieved according to the invention wherein a combustion engine has an exhaust-gas turbosupercharger, the latter having a compressor casing flanged to the turbine casing such that the exhaust gas return system comprises a connecting pipe and a control valve, the assembly comprising an arrangement of the exhaust-gas return system at the exhaust-gas turbosupercharger between the hot-gas inlet of the turbine casing and the air-charge outlet of the compressor casing.

By means of the exhaust-gas return system connected at the exhaust gas turbosupercharger according to the invention, relatively long and therefore heavy exhaust-gas return pipes including additional mountings are advantageously avoided. Since there is no long exhaust-gas return pipe, access to the structural components of the internal-combustion engine is significantly improved. The arrangement also results in an improved accessibility of the whole exhaust-gas return system and therefore also facilitates maintenance when the internal-combustion engine is built in. Further, by means of the invention, an assembly unit is advantageously created consisting of the exhaust-gas turbosupercharger and the complete exhaust-gas return system. Finally, the arrangement as connected also results in a longer mixing path of the air charge and the returned exhaust gas.

An object of the invention is an exhaust-gas return system which comprises an overflow opening in the wall of the turbine casing connected with a damming chamber assigned to an integrated exhaust-gas bypass valve, in the hot-gas inlet duct of the turbine of the exhaust-gas turbosupercharger. Another object of the invention is an exhaust-gas return system which, by means of an aperture in the wall of the compressor casing, is connected with an annular chamber disposed in the compressor outlet duct, a transverse inflow of the returned exhaust gas with a damming effect of the air charge in the outlet duct of the compressor being thereby avoided. Another object of the invention is an exhaust-gas return system wherein a section of a connecting pipe is disposed at a connecting piece of a compressor casing tangentially to an annular chamber and aimed in outflow direction of the compressed air charged which results in a good mixing of the exhaust gas and the air charge without any special disturbance of the flow of the air charge.

Figure 1:
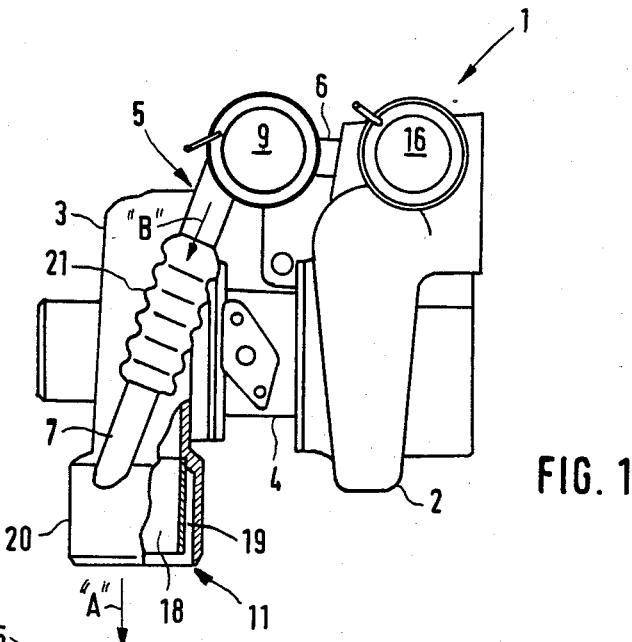
FIG. 1 shows a top view of an arrangement of the exhaust-gas return system at an exhaust-gas turbosupercharger.

An exhaust-gas turbosupercharger 1 of an internal-combustion engine, that is not shown, has a turbine casing 2, to which a compressor casing 3 is flanged by means of a bearing housing 4. Connected with the exhaust-gas turbosupercharger 1 is an exhaust-gas return mechanism 5 for the internal-combustion engine. The exhaust-gas return mechanism 5 has a connecting pipe 8 consisting of sections 6 and 7, as well as an interconnected control valve 9. The exhaust-gas return mechanism 5 is disposed between the hot-gas inlet 10 of the turbine casing 2 and the air charge outlet 11 of the compressor casing 3.

Figure 2:
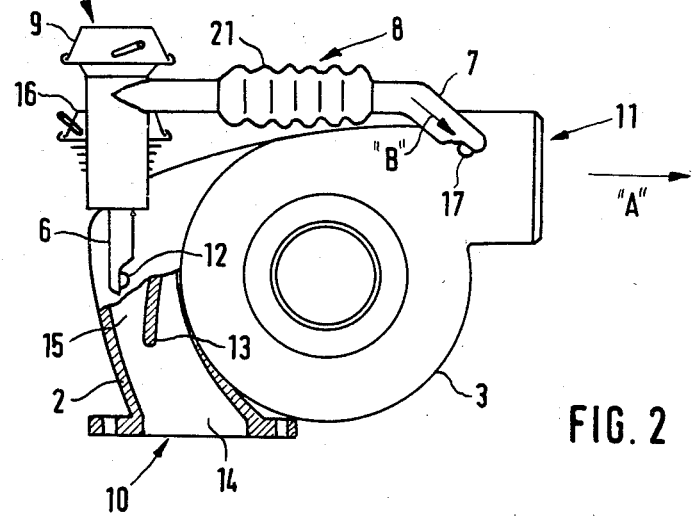
FIG. 2 shows a lateral view of the arrangement according to FIG. 1.

As shown in FIG. 2, section 6 of the connection of the exhaust-gas return mechanism 5, by an aperture 12 in the wall of the turbine casing 2, is connected with a damming chamber 15 formed by a separating wall 13 in the hot-gas inlet duct 14. The damming chamber 15 is also connected with a bypass pipe (not shown) controlled by an exhaust-gas bypass valve 16 arranged at the turbine casing 2. In addition, the exhaust-gas return mechanism 5, through a pipe section 7, by means of an aperture 17 in the wall of the compressor casing 3, is connected with an annular chamber 19 disposed in the compressor outlet duct 18. Also, the pipe section 7 on the side of the compressor is disposed at the connecting piece 20 of the compressor casing 3 tangentially to the annular chamber 19 and sloped in outflow direction, shown by Arrow "A," of the compressed air charge. Thus a screw-thread-like inflow of the returned exhaust gas, shown by Arrow "B," into the air charge is achieved for good mixing.

By means of a bellows pipe 21 in the pipe section 7, deviations caused by component tolerances and temperature differences are compensated. The control valve 9 is disposed at the turbine casing 2 by means of the pipe section 6. By means of this attachment of the control valve 9 on the hot-gas-side, the self-cleaning of the valve 9 is ensured, and the weight of the control valve 9 is absorbed by the turbine casing 2 flanged to an exhaust-gas collector of the internal-combustion engine.

We claim:

1. For an internal combustion engine having an exhaust turbocharger comprising an exhaust turbine having a hot gas inlet and a charged-air compressor,
   a turbine housing for the exhaust turbine having a first wall and a separating wall to form a damming chamber means between the first and separating walls,
   a charged-air guiding means for the charged-air compressor comprising an annular chamber means,
   an exhaust-gas return means comprising
   a connecting pipe means comprising plural pipe sections and a control valve,
   the connecting pipe means having two ends, a first of which is connected to the damming chamber means, and
   connecting means connecting the second end of the connecting pipe means tangentially to the annular chamber means for generating a screw-thread-like inflow of exhaust gas from the connecting pipe means to the output of the charged-air guiding means.

2. An arrangement according to claim 1 wherein
   at least one of said pipe sections comprises rigid connection pipe structurally connected for support of the control valve to the turbine housing at the first wall, and
   the connecting means comprises a bellows pipe connected between the control valve and the annular chamber means.

* * * * *